Nov. 23, 1937. K. CONNELL 2,099,842
GAS FLOW MEANS FOR ANESTHETIC APPARATUS AND THE LIKE
Filed Nov. 16, 1936
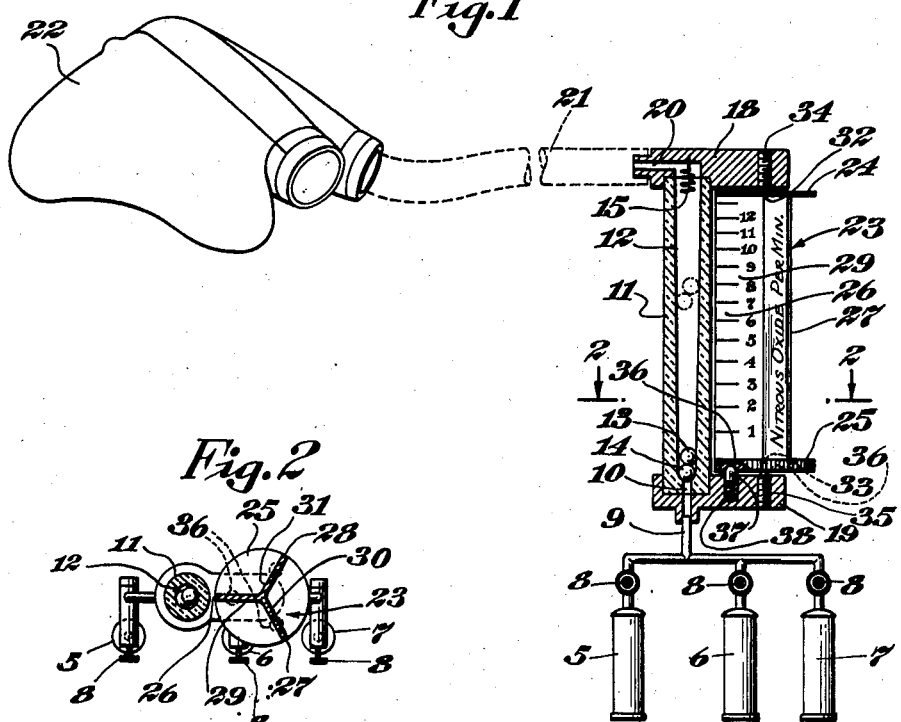
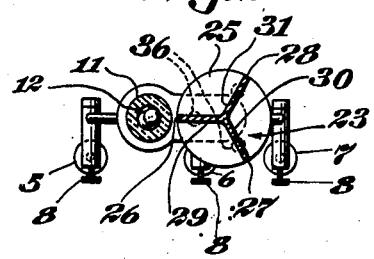
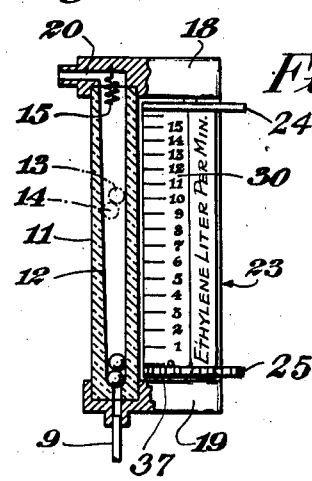
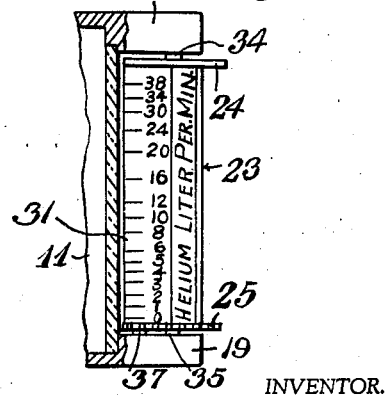
INVENTOR.
Karl Connell,
BY Robert Irving Williams
ATTORNEY.

Patented Nov. 23, 1937

2,099,842

UNITED STATES PATENT OFFICE 2,099,842

GAS FLOW MEANS FOR ANESTHETIC APPARATUS AND THE LIKE

Karl Connell, Branch, N. Y.

Application November 16, 1936, Serial No. 111,027

4 Claims. (Cl. 73—198)

This invention relates to gas-flow means, and, particularly, to means for supplying gas for anesthetic and therapeutic purposes.

In general it is an object of the invention to provide a simple, economical, and effective gas-flow means whereby the flow of gases of a plurality of different characters may be accurately ascertained and controlled.

More specifically it is an object of the invention to provide gas-flow means embodying a single flow gage adapted to be effectively and satisfactorily utilized for ascertaining the flow of gases of a plurality of different characters.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention reference should be had to the following detailed description taken in connection with the accompanying drawing, in which:

Figure 1 is a side view of one form of apparatus embodying the invention;

Fig. 2 is a horizontal sectional view along the line 2—2 in Fig. 1;

Fig. 3 is a fragmentary view similar to Fig. 1 showing the scale unit in a different position, with another scale adjacent to the gage-tube; and Fig. 4 is a similar view showing the scale unit in still another position, with a third scale adjacent to the gage-tube.

In the control of gas flow and, especially, in the supply of gas for particular uses, as in anesthetic and therapeutic apparatus, it is often desirable to utilize different gases at different times. For instance, various anesthetic and therapeutic uses require the administration, at various times, of nitrous oxide, carbon dioxide, cyclopropane, ethylene, helium, and various other gases. The densities of these gases differ from one another in greater or less degrees. While certain anesthetic gases,—for instance, nitrous oxide and carbon dioxide—, have the same density, and others have such similar densities, or such readily transposable density figures, that sometimes the same scale has been utilized for the reading of the flow of two or more gases; nevertheless, the densities of many commonly-utilized gases differ in such a manner that the use of a single flow gage has been considered impractical, except in instances where an adjustable gage was utilized. Since there are many types of situations wherein the use of an adjustable gage is undesirable, it has ordinarily been considered necessary to utilize separate flow gages for the administration of most of the gases commonly administered with the same apparatus; and anesthetic apparatus have commonly been constructed in the past with a battery of flow gages each calibrated for a gas of different density. This has added greatly to the expense, complexity, and operating difficulties of such apparatus.

With the foregoing and other difficulties in view, the present invention contemplates the provision of simple and effective means of general application whereby the flow of gases of widely different character may be indicated in a single flow gage; a plurality of scales for the reading of the flow of these gases being provided in accordance with the invention.

In the form of the invention exemplified there is provided anesthetic apparatus equipped with three sources, 5, 6, and 7, of gases under pressure, such for instance as anesthetic or therapeutic gases. For example, the source 5 may be a container for compressed nitrous oxide, the source 6 may be a container for compressed ethylene, and the source 7 may be a container for compressed helium. At the outlet of each container there is provided a valve 8. These valves, which are illustrated diagrammatically, may be decompression valves of the type illustrated in my Patent No. 2,023,915, dated December 10, 1935, or may be of any other known or suitable type. Upon the opening of any valve, gas will pass from a container into a conducting means 9 by which the gas is carried to an opening 10 in the lower end of a flow gage 11. This gage may be of any well known or suitable type equipped with indicating means whereby the amount of gas-flow therethru may be readily ascertained. As exemplified, the gage is of the character disclosed and claimed in my Patent No. 1,965,333, dated July 3, 1934, and consists of a tube of transparent material formed with a central bore 12 which increases in diameter upwardly. In this tube are indicating means consisting of a pair of balls 13 and 14 which are lifted by the flowing gas to such point that cross section of the tube at that point will be sufficiently large to permit gas to flow past the balls without further lifting them. At the top of the tube is a rebound spring 15. The tube is held in place by fixed frame members 18 and 19; the former being formed with a bore 20 constituting a part of a conduit 21 leading to an administrative portion of the anesthetic apparatus, as exemplified by the face mask 22.

In accordance with the invention there is provided means whereby the flow of a plurality of different gases thru the gage 11 may be directly read from the position of the balls, such means in the exemplified form comprising a plurality of scales movable into indicating position adjacent the gage and calibrated for the direct reading of flow of gases of different characters, such for instance as gases from sources 5, 6, and 7, respectively. As exemplified, there is provided a scale unit 23 comprising, in the present instance, upper and lower discs 24 and 25, and wings 26, 27, and 28 extending radially at angles of 120° from each other. On the corresponding faces of the wings 26, 27, and 28 there are provided scales 29, 30, and 31 calibrated for the direct reading of the flow thru the gage 11 of different gases, such for instance as nitrous oxide, ethylene, and helium, respectively. In Fig. 1 the scale for nitrous oxide is shown in position, in Fig. 3 the scale for ethylene is shown in position, and in Fig. 4 the scale for helium is shown in position. The discs 24 and 25 are centrally mounted on bearings 32 and 33 formed on the ends of screws 34 and 35. By unscrewing the screws, a unit may be replaced by another unit carrying different scales, if desired. In order to releasably retain any particular scale in a position adjacent to the gage 11 there are provided recesses 36 in the bottom of the disc 25 in association with each of the wings 26, 27, and 28; and in the lower frame member 19 there is provided a longitudinally movable nub 37 which is pushed upwardly by a spring 38 so that it may engage with a recess. As will be seen, when the valve associated with the container 5 is to be opened, the scale unit 23 will be swung so as to bring the scale 29 in proximity to the gage tube; when the valve to the container 6 is to be opened, the unit 23 will be swung so as to bring the differently calibrated scale 30 adjacent to the gage tube; and when the valve to the container 7 is to be opened, the unit 23 will be rotated so as to bring the differently calibrated scale 31 into position adjacent to the gage tube. It is to be noted that, as exemplified, each of the wings extends radially from the axis of rotation of the unit a distance substantially equal to the distance between the axis of the unit and the gage, so that each wing is movable by the rotation of the unit into a position substantially perpendicular to the side of the gage and with its edge in close proximity to said side.

It will thus be seen that there may be provided, in accordance with the invention, types of apparatus of exceedingly simple construction whereby the flow of a variety of different gases, for instance different anesthetic gases, may be determined and regulated with the utmost ease.

Since certain changes may be made in the above construction and different embodiments of the invention could be made without departing from the scope thereof, it is intended that all matter contained in the above description or shown in the accompanying drawing shall be interpreted as illustrative and not in a limiting sense.

The invention claimed is:

1. Gas-flow means comprising a plurality of sources of gas under pressure, a flow gage, means for connecting said sources to said flow gage, means for controlling the flow of gas from said sources so that gas of a certain character will be flowing thru said gage at one time and gas of another character will be flowing thru said gage at another time, a scale unit rotatably mounted adjacent said gage and carrying a plurality of scales each movable by the rotation of said unit into a position substantially perpendicular to the side of said gage and with its edge in close proximity to said side, each of said scales being calibrated for the direct reading of the flow of gas of one of said characters, and said control means being adapted for the regulation of the amount of flow of the flowing gas, and means to releasably retain said unit in position for the easy viewing of the scale corresponding to the flowing gas.

2. Gas flow means comprising a flow gage, means to selectively admit gases of different characters to said gage, and a scale unit rotatably mounted adjacent to said gage and comprising a plurality of wings extending radially from the axis of rotation of said unit a distance substantially equal to the distance between said axis and the gage, each of said wings carrying a scale calibrated for the direct reading of the flow of gas of a given character.

3. Gas flow means comprising a flow gage, means to selectively admit gases of different characters to said gage, a scale unit rotatably mounted adjacent to said gage and comprising a multiplicity of wings extending radially from the axis of rotation of said unit a distance substantially equal to the distance between said axis and the gage, each of said wings carrying a scale extending to the outer edge thereof and calibrated for the direct reading of the flow of gas of a given character, and means to retain said unit in position with any one of said scales in a position substantially perpendicular to the side of said gage but substantially immediately removable therefrom and replaceable by another of said scales in said position.

4. Gas flow means comprising a flow gage, means to selectively admit gases of different characters to said gage, a scale unit rotatably mounted adjacent to said gage and comprising a plurality of wings extending radially from the axis of rotation of said unit a distance substantially equal to the distance between said axis and the gage, each of said wings carrying a scale calibrated for the direct reading of the flow of gas of a given character, and means for replaceably mounting said unit.

KARL CONNELL.